(12) United States Patent
Fairy (10) Patent No.: US 7,314,367 B2
(45) Date of Patent: Jan. 1, 2008

(54) HOT RUNNER NOZZLE COLLAR FOR AN INJECTION MOLDING APPARATUS

(75) Inventor: Fabrice Fairy, Georgetown (CA)

(73) Assignee: Mold-Masters (2007) Limited, Georgetown, Ontario (CA)

( * ) Notice: Subject to any disclaimer, the term of this patent is extended or adjusted under 35 U.S.C. 154(b) by 291 days.

(21) Appl. No.: 11/065,565

(22) Filed: Feb. 25, 2005

(65) Prior Publication Data

US 2006/0193942 A1    Aug. 31, 2006

(51) Int. Cl.
B29C 45/20    (2006.01)

(52) U.S. Cl. .................... 425/549; 264/328.15

(58) Field of Classification Search ............. 425/549; 264/328.15
See application file for complete search history.

(56) References Cited

U.S. PATENT DOCUMENTS

| | | | |
|---|---|---|---|
| 4,787,840 A | 11/1988 | Gellert | |
| 5,474,440 A | 12/1995 | Gellert | |
| 5,614,233 A * | 3/1997 | Gellert | 425/549 |
| 5,851,565 A | 12/1998 | Garver et al. | |
| 6,162,043 A | 12/2000 | Gellert | |
| 6,220,851 B1 | 4/2001 | Jenko | |
| 6,261,084 B1 | 7/2001 | Schmidt | |
| 6,890,473 B2 | 5/2005 | Ho et al. | |
| 2004/0043102 A1 | 3/2004 | Ho et al. | |

FOREIGN PATENT DOCUMENTS

| | | |
|---|---|---|
| CA | 2127211 | 12/1995 |
| CA | 2137702 | 6/1996 |
| WO | WO 02/070226 A1 | 9/2002 |

* cited by examiner

*Primary Examiner*—Tim Heitbrink
(74) *Attorney, Agent, or Firm*—Medler Ferro PLLC (57) ABSTRACT

A collar for an injection molding apparatus includes an upstream end for maintaining a head of a hot runner nozzle in contact with an outlet surface of a manifold and a downstream end for abutting a mold plate. An inner surface of the collar contacts an outer surface of the nozzle in order to align a nozzle channel of the nozzle with a manifold channel outlet of the manifold. A noncircular ridge protrudes from the inner surface of the collar in order to reduce contact between the outer surface of the nozzle and the collar.

14 Claims, 7 Drawing Sheets

HOT RUNNER NOZZLE COLLAR FOR AN INJECTION MOLDING APPARATUS

FIELD OF THE INVENTION

The present invention relates generally to an injection molding apparatus and, in particular to a collar for a hot runner nozzle.

BACKGROUND OF THE INVENTION

In a typical injection molding apparatus, a manifold having a manifold channel delivers melt to a plurality of hot runner nozzles. The hot runner nozzles are received in respective openings in a mold plate and extend between the manifold and a plurality of mold cavities. Each nozzle includes a nozzle channel that is aligned with an outlet of the manifold channel to receive melt therefrom and to deliver the melt to a mold gate of a mold cavity. The nozzles are coupled to an outlet surface of the manifold and a seal must be maintained therebetween in order to prevent leakage and allow for the injection molding apparatus to operate efficiently.

Typically, a collar is provided between the mold plate and a head of each nozzle to couple the nozzle to the outlet surface of the manifold. Since each collar must contact both the heated nozzle and the cold mold plate in order to align the nozzle with the manifold channel and the mold gate, a significant amount of heat may be lost from each nozzle. In an effort to reduce the heat loss often the collar includes a circular undercut that may be provided on one or both of the inner surface and the outer surface thereof. Typically, the area of the collar in contact with the nozzle remains relatively large in order to maintain the strength of the part to prevent failure under the lateral forces concentrated on the collar after thermal expansion of the system, those forces are large enough to maintain a sealing force between the nozzle and the manifold. The relatively large contact area of the collar concentrates the heat loss and results in a significant decrease in temperature in the contact area. Such heat loss is undesirable and may adversely affect the molding process resulting in poor quality molded parts being produced. It is therefore desirable to minimize the amount of heat that is lost from the nozzle through the collar.

SUMMARY OF THE INVENTION

An injection molding apparatus according to the present invention includes a manifold for receiving a melt stream of moldable material from a source and an injection molding nozzle for receiving the melt stream from the manifold and delivering the melt stream to a mold cavity. A collar for positioning the nozzle with respect to an outlet surface of the manifold and for aligning the nozzle with the mold cavity is provided. The collar includes a ridge protruding from an inner surface that contacts the nozzle to align the nozzle for receiving the melt stream from the manifold channel. In an embodiment, the ridge forms a continuous helical "path" along the inner surface of the collar from an upstream to a downstream end of the collar.

According to another embodiment of the present invention, there is provided a collar for an injection molding apparatus. The collar including an upstream end for maintaining a head of a rear mounted nozzle in contact with an outlet surface of a manifold and a downstream end for abutting a mold plate. An inner surface of the collar includes a ridge for contacting an outer surface of the nozzle to align a nozzle channel of the rear mounted nozzle with an outlet of a manifold channel of the manifold. The ridge forming a non-circular, discontinuous path along the inner surface of the collar that reduces contact between the outer surface of the rear mounted nozzle and the collar.

BRIEF DESCRIPTION OF THE FIGURES

Embodiments of the present invention will now be described more fully with reference to the accompanying drawings in which like reference numerals indicate similar structure.

DETAILED DESCRIPTION OF THE INVENTION

Figure 1:
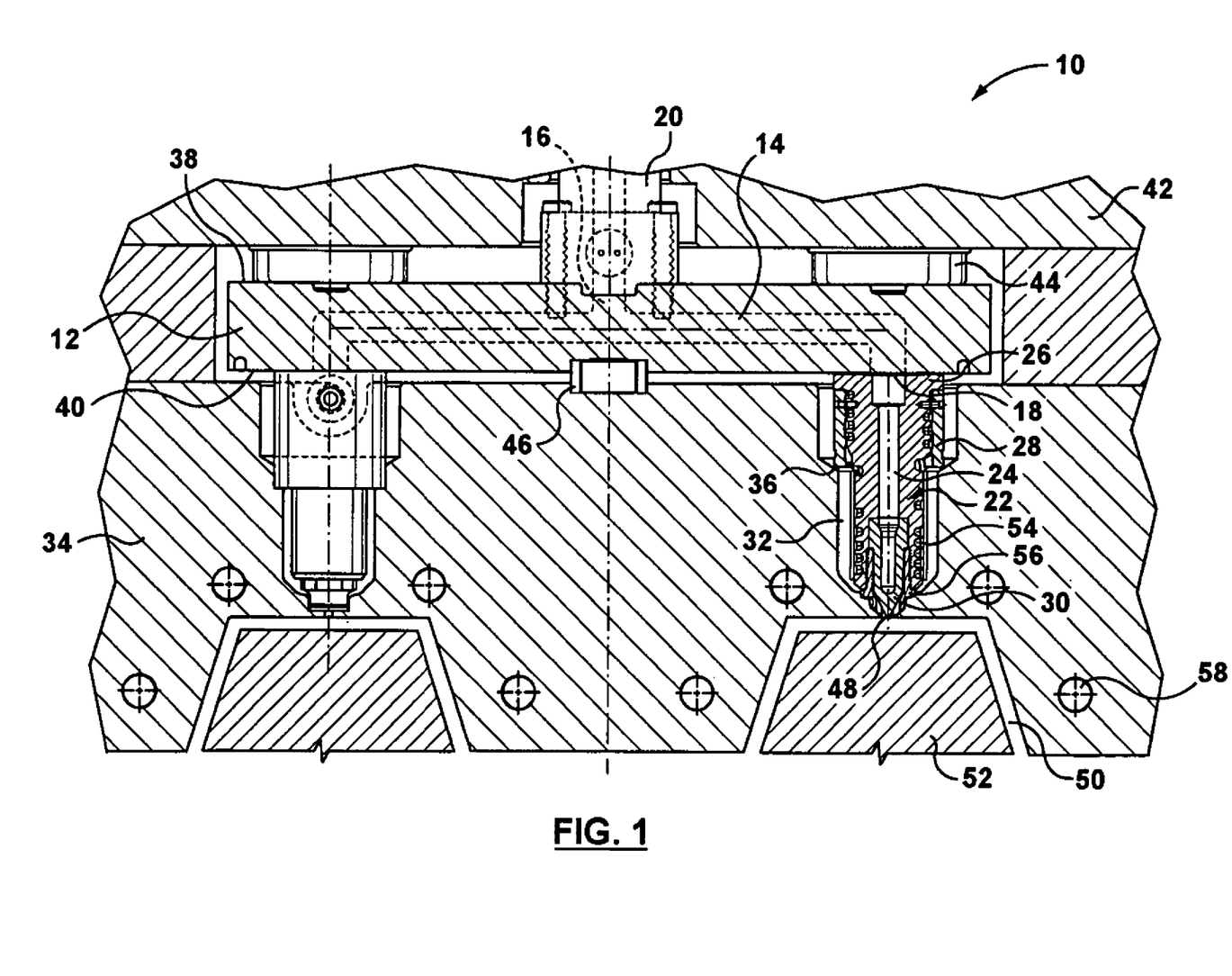
FIG. 1 is a side sectional view of an injection molding apparatus according to an embodiment of the present invention.

Referring now to FIG. 1, an injection molding apparatus 10 is generally shown. Injection molding apparatus 10 includes a manifold 12 having a manifold melt channel 14. Manifold melt channel 14 extends from an inlet 16 to manifold outlets 18. Inlet 16 of manifold melt channel 14 receives a melt stream of moldable material from a machine nozzle (not shown) through a sprue bushing 20 and delivers the melt to hot runner nozzles 22, which are in fluid communication with respective manifold outlets 18. Although a pair of hot runner nozzles 22 is shown in FIG. 1, it will be appreciated that a typical injection molding apparatus may include only one or a plurality of hot runner nozzles for receiving melt from respective manifold outlets.

Figure 2:
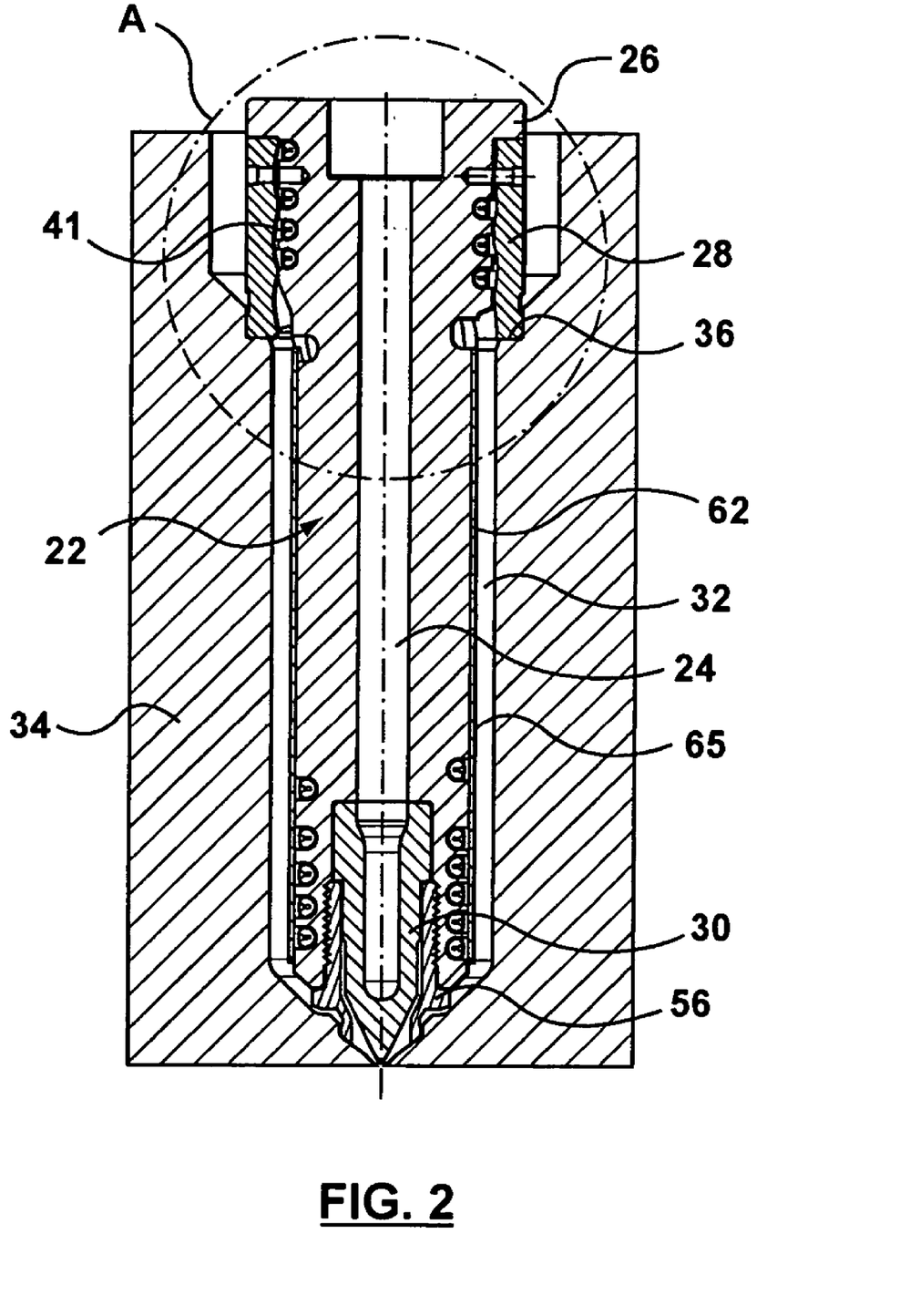
FIG. 2 is a side sectional view of a portion of FIG. 1.

Referring also to FIG. 2, each hot runner nozzle 22 is received in an opening 32 in a mold plate 34. A collar 28 surrounds the nozzle 22. The collar 28 abuts a step 36, which is provided in opening 32 to maintain a nozzle head 26 of the hot runner nozzle 22 in abutment with a lower surface 40 of manifold 12. The nozzle 22 is rear mounted relative to mold plate 34. A nozzle tip 30 is received in a downstream end of hot runner nozzle 22. The nozzle tip 30 is coupled to the hot runner nozzle 22 by a transfer seal 56. The transfer seal 56 is threaded to the hot runner nozzle 22. A nozzle melt channel 24 extends through hot runner nozzle 22 and nozzle tip 30. Nozzle melt channel 24 is in communication with manifold outlet 18 to receive melt from manifold channel 14. Hot runner nozzle 22 is heated by a heating element 41 that extends through groove 54, which is formed in an outer surface 62 of the nozzle 22. The groove 54 is generally helical and extends in a clockwise direction from the nozzle head 26 to the nozzle tip 30. A thermocouple (not shown) is coupled to the nozzle 22 to provide temperature measurements thereof. In one embodiment, a highly conductive coating 65 surrounds nozzle 22.

Referring back to FIG. 1, a mold cavity 50 is provided between mold plate 34 and a mold core 52. Mold cavity 50 receives melt from nozzle melt channel 24 through a mold gate 48. Cooling channels 58 extend through mold plate 34 to cool mold cavity 50.

Manifold 12 is maintained in position relative to mold plate 34 by a locating ring 46. Spacers 44 are provided between an upper surface 38 of manifold 12 and a back plate 42.

Referring to FIGS. 3, 3A, and 4 to 7, collar 28 includes an upstream surface 64 for abutting nozzle head 26 and a downstream surface 66 for abutting step 36 of mold plate 34. An inner surface 68 of the collar 28 includes a continuous ridge 70 and a valley portion 71. Ridge 70 has a greater wall thickness than valley portion 71, which results in ridge 70 protruding from valley portion 71 toward a longitudinal axis of collar 28. Accordingly, contact between collar 28 and outer surface 62 of nozzle 22 occurs only along ridge 70, shown by example in FIG. 3A as points $P^1$, $P^2$, $P^3$, $P^4$, and $P^5$.

Figure 3:
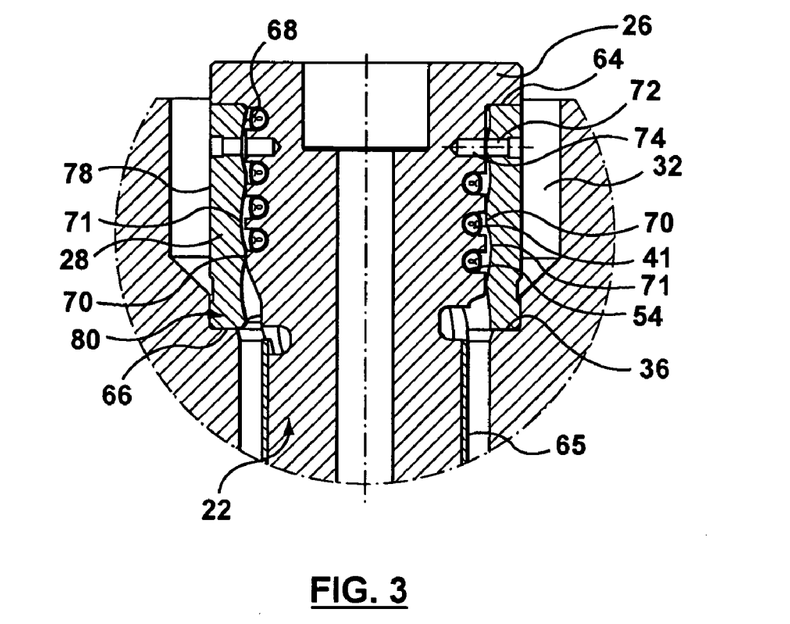
FIG. 3 is an enlarged view of portion A of FIG. 2.
Figure 3A:
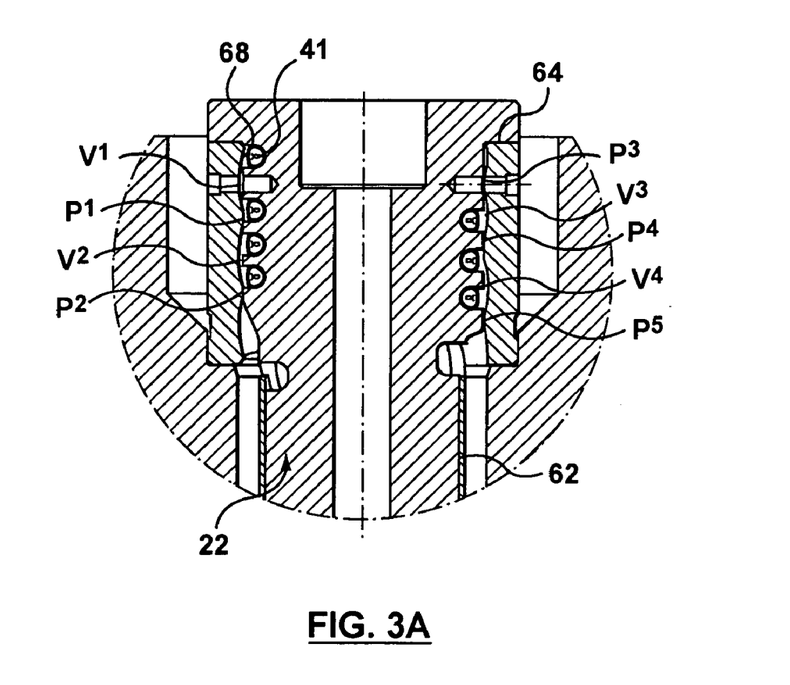
FIG. 3A is an enlarged view of portion A of FIG. 2.

Further shown by example in FIG. 3A are points $V^1$, $V^2$, $V^3$, and $V^4$ of valley portion 71 that are shown spaced apart from, i.e., out of contact with, outer surface 62 of nozzle 22.

In the embodiment shown in FIGS. 3, 3A and 4-7, both ridge 70 and valley portion 71 adjacently extend in a generally helical path from upstream surface 64 to downstream surface 66. Ridge 70 is formed in an out-of-phase relationship with or in an opposite direction of helical heater groove 54, which results in ridge 70 being out of synch with heater groove 54 when collar 28 is concentric with nozzle 22. As such when collar 28 is positioned about nozzle 22, the majority of contact between ridge 70 and nozzle 22 is with outer surface 62 of nozzle 22 with minimal contact between ridge 70 and a heating element contained within heater groove 54.

A pitch, i.e., the longitudinal distance between each "winding" of continuous ridge 70, and a width of ridge 70 is selected to minimize contact between inner surface 68 of collar 28 and outer surface 62 of the nozzle 22, while still providing sufficient strength to withstand lateral loads that may be caused due to thermal expansion. Further, the pitch and width of ridge 70 of collar 28 also provide for proper alignment of collar 28 and nozzle 22, while also distributing the locations of contact between ridge 70 and outer surface 62 so that there is no concentration of heat loss. In one embodiment, a width of ridge 70 is less than a width of valley portion 71, wherein the width of valley portion 71 is equal to the pitch of ridge 70. In an alternate embodiment a width of ridge 70 is less than half of a width of valley portion 71, wherein the width of valley portion 71 is equal to the pitch of ridge 70.

The collar 28 may be made from an insulative material, such as titanium or ceramic, for example, or may alternatively be made of a non-insulative material, such as tool steel, for example.

Figure 4:
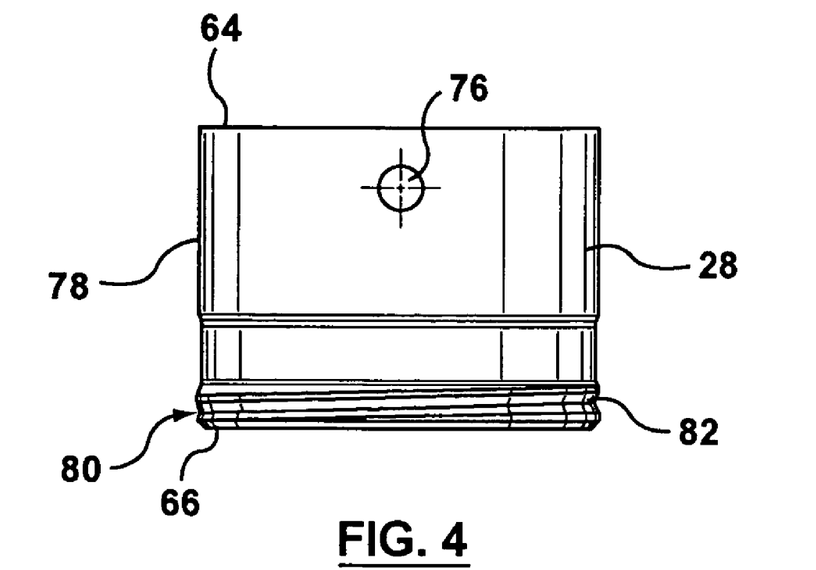
FIG. 4 is a side view of a collar of the injection molding apparatus of FIG. 1.
Figure 5:
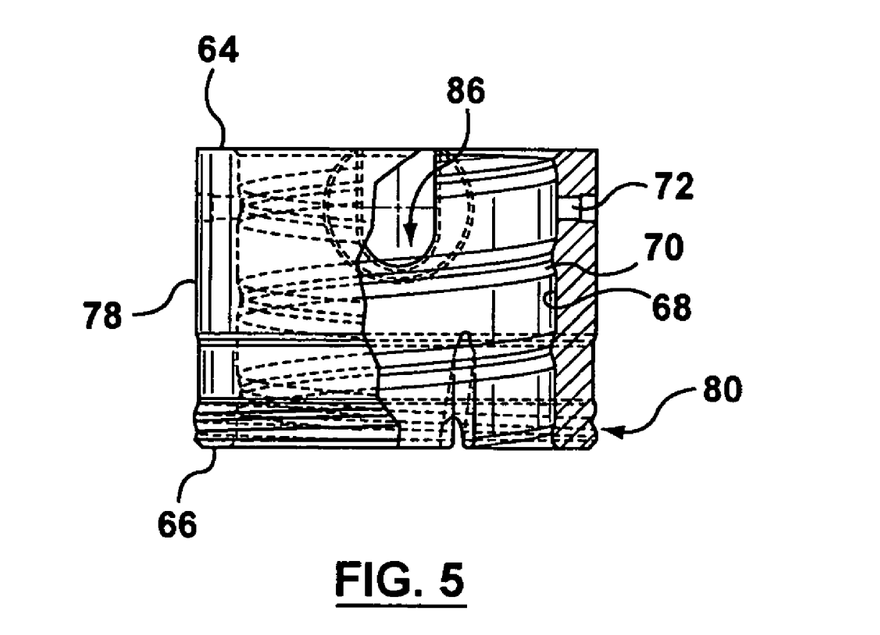
FIG. 5 is a side sectional view of the collar of FIG. 4.
Figure 6:
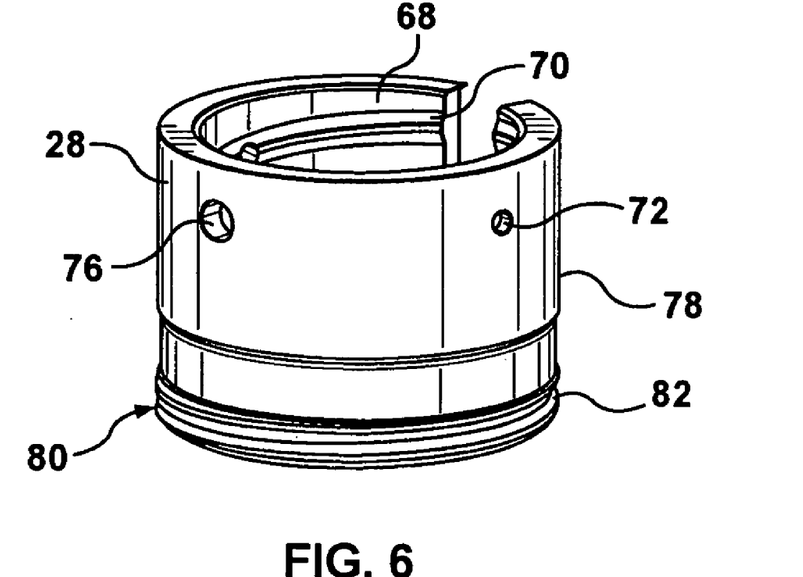
FIG. 6 is an perspective view of the collar of FIG. 4.
Figure 7:
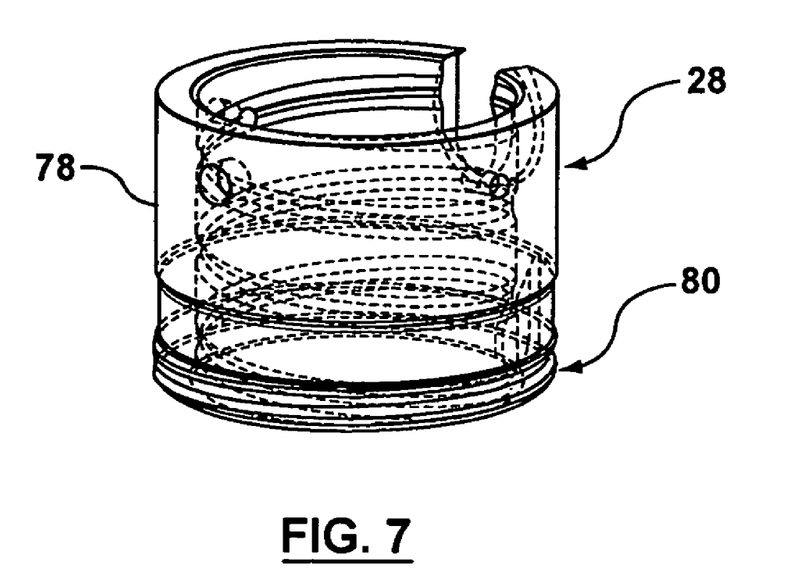
FIG. 7 is a view similar to FIG. 6 showing a helical ridge on an inner surface of the collar.

Apertures 72 extend through the collar 28 and are aligned with bores 74 that extend partially into nozzle 22. A dowel pin (not shown) extends through each aperture 72 and respective bore 74 in order to retain and align the collar 28 with respect to the nozzle 22. A retaining aperture 76, shown in FIGS. 4 and 6, is provided to retain the assembly including nozzle 22 and collar 28 relative to the mold plate 34.

An outer surface 78 of the collar 28 includes a downstream portion 80, which is adjacent to downstream surface 66, that contacts the mold plate 34. A second ridge 82, which is generally helical, is provided in the outer surface 78 of the collar 28 to reduce the amount of contact between the outer surface 78 and the mold plate 34. The second ridge 82 may be formed in either a clockwise or a counter-clockwise direction. The amount of surface contact between the collar 28 and the mold plate 34 may be significantly reduced when compared to a conventional collar having a single circular undercut. The collar 28 is stable and prevents tipping of the nozzle under lateral loads due to the distribution of contact surfaces along a longitudinal length of the second ridge 82.

A slot 84 is provided in downstream end of collar 28 for receiving the thermocouple. A cutout 86 is provided in upstream end of collar 28 for allowing an electrical connector (not shown) to pass therethrough. The electrical connector joins the heating element of nozzle 22 to a power source that is located remotely from the nozzle 22.

It will be appreciated by persons skilled in the art that in alternate embodiments of the present invention, the width of the ridges 70, 82 may be varied and/or the pitch of the ridges 70, 82 may be irregular. Further in alternate embodiments of the present invention, ridges 70, 82 may be other than helically wound about the surfaces of collar 28, and may be discontinuous, i.e., broken into a plurality of sections. Accordingly, a noncircular pattern in which the position of a ridge, or a plurality of ridges, between the upstream and downstream ends varies about the inner circumference of the collar, may be used in keeping with the spirit of the invention.

In operation, melt is injected from the machine nozzle into manifold channel 14 of manifold 12 through sprue bushing 20. Nozzle melt channels 24 of nozzles 22 receive melt from manifold outlets 18 and deliver the melt to mold cavities 50 through mold gates 48. The collar 28 functions to align the nozzle channel 28 with the manifold channel 14 and to insulate the nozzle 22 by minimizing the amount of heat loss during operation of the injection molding apparatus 10. Once the mold cavities 50 have been filled with melt, the melt is cooled and the molded parts are ejected from injection molding apparatus 10.

In an alternate embodiment, the collar 28 includes a ridge 70 formed in the inner surface 68 thereof as has been previously described and outer surface 78 of collar 28 includes a conventional circular undercut. Similarly, the outer surface 78 of the collar 28 includes a second ridge 82 as has been previously described and the inner surface 68 includes a conventional circular undercut, or a ridge on an inside surface similar to ridge 82.

Figure 8:
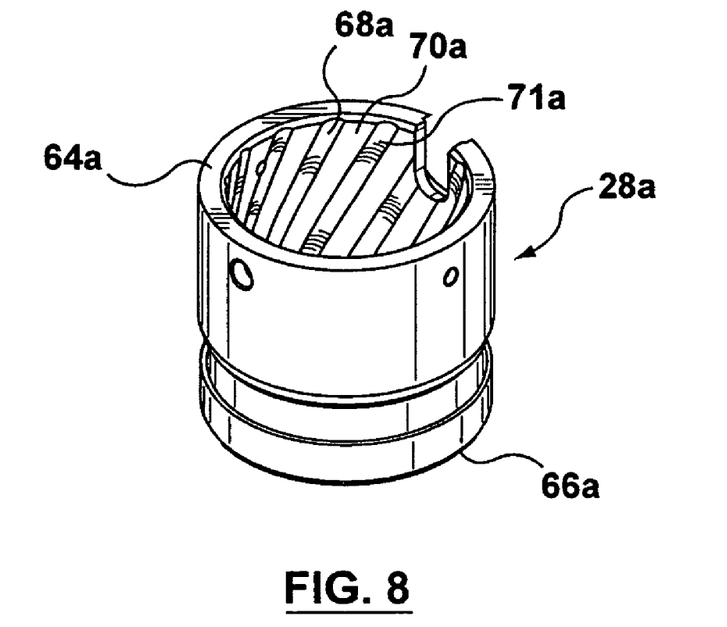
FIG. 8 is an perspective view of a collar according to an alternate embodiment of the invention.

In an alternate embodiment, a collar 28a for use in an injection molding apparatus, such as injection molding apparatus 10 of FIG. 1, is shown in FIG. 8. In this embodiment, an inner surface 68a of collar 28a includes a plurality of ridges 70a projecting from a plurality of valley portions 71a. The ridges 70a and valley portions 71a generally extend on a diagonal, as shown, between upstream surface 64a and downstream surface 66a. The ridges 70a and valley portions 71b may alternatively extend in an opposite diagonal direction. In the embodiment of FIG. 8, ridges 70a and valley portions 71a are of substantially equal width, such as to be evenly spaced about the inner circumference of collar 28a. In a further embodiment, the ridges and/or valley portions may be of unequal widths and thereby irregularly spaced about the inner circumference of the collar 28a.

Figure 9:
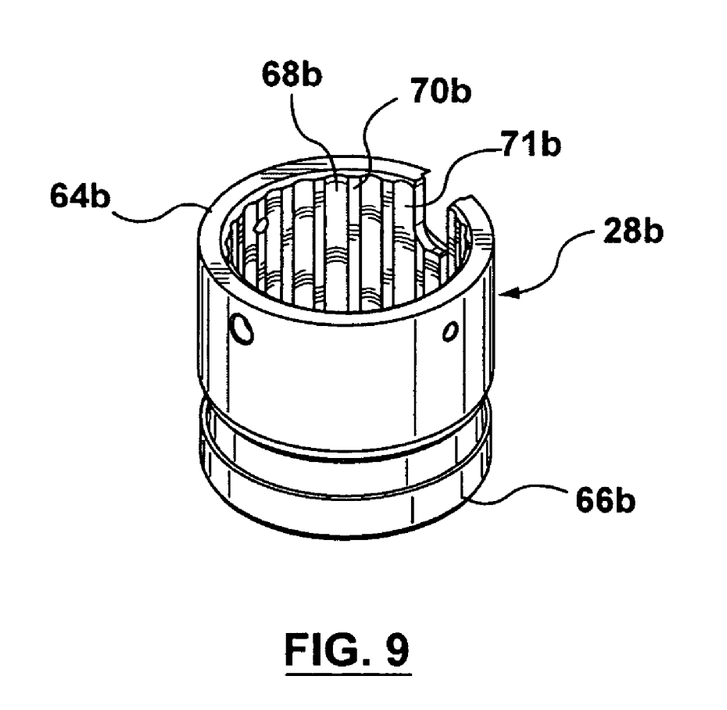
FIG. 9 is an perspective view of a collar according to an alternate embodiment of the invention.

FIG. 9 shows another embodiment of a collar 28b for use in an injection molding apparatus, such as apparatus 10 of FIG. 1. In this embodiment, inner surface 68*b* of the collar 28*b* includes a plurality of ridges 70*b* project from a plurality of valley portions 71*b*. Each ridge 70*b* and valley portion 71*b* extends generally in a straight line between upstream surface 64*b* and downstream surface 66*b*. In FIG. 9, ridges 70*b* are not as wide as valley portions 71*b*. In a further embodiment, both or either of ridges 70*b* and/or valley portions 71*b* may be of unequal widths as to be irregularly spaced about the inner circumference of collar 28*b*. Although not shown, ridges 70*a* and 70*b* of FIGS. 8 and 9 may also be discontinuous to reduce contact between the ridges 70*a*, 70*b* and an outer surface of the nozzle.

Figure 10:
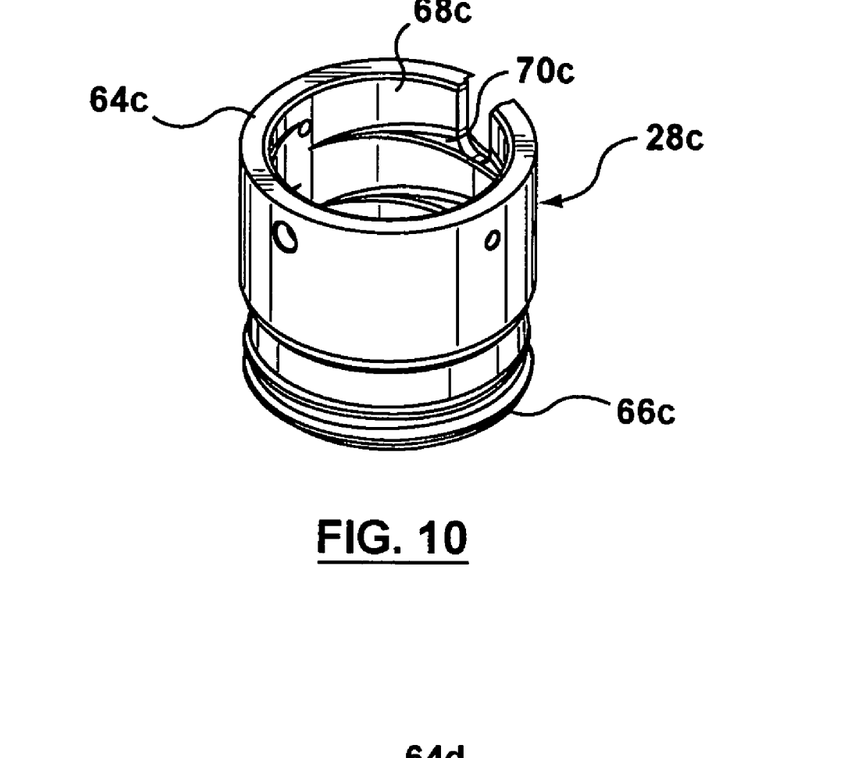
FIG. 10 is an perspective view of a collar according to an alternate embodiment of the invention.

Referring to FIG. 10, another embodiment of a collar 28*c* for use in an injection molding apparatus, such as apparatus 10 of FIG. 1, is shown. The collar 28*c* includes a plurality of ridges 70*c* that project from an inner surface 68*c* thereof. As shown, the ridges 70*c* are spaced from one another forming a discontinuous helical path, which extends between an upstream surface 64*c* and a downstream surface 66*c*. Ridges 70*c* may helically extend in a clockwise or counterclockwise direction.

Figure 11:
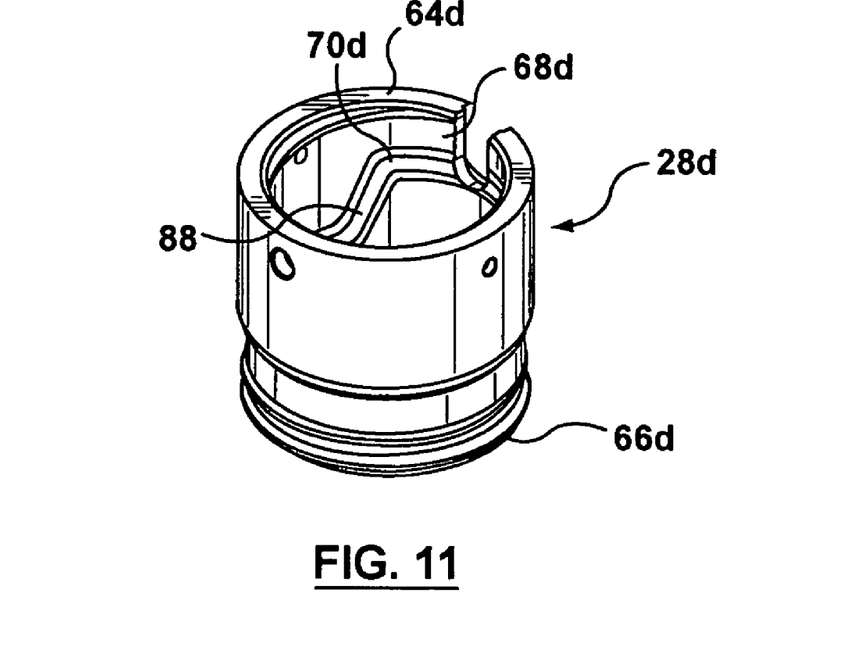
FIG. 11 is an perspective view of a collar according to an alternate embodiment of the invention.

FIG. 11 shows another embodiment of a collar 28*d* for use in an injection molding apparatus such as apparatus 10 of FIG. 1. The collar 28*d* includes a ridge 70*d* that projects from an inner surface 68*d*. The ridge 70*d* extends in a generally helical path that is interrupted by steps 88, which are provided at several locations on inner surface 68*d*. The ridge 70*d* extends between upstream surface 64*d* and downstream surface 66*d* in a counter-clockwise direction, however, may alternatively extend in a clockwise direction.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An injection molding apparatus comprising:
    a manifold having a manifold channel for receiving a melt stream of moldable material under pressure;
    a nozzle received in an opening in a mold plate, said nozzle having a nozzle channel for receiving said melt stream from said manifold channel;
    a mold cavity for receiving melt from said nozzle channel through a mold gate;
    a collar for coupling said nozzle to an outlet surface of said manifold, a downstream surface of said collar abutting said mold plate to sandwich a head of said nozzle between an upstream surface of said collar and said outlet surface of said manifold; and
    a ridge protruding from an inner surface of said collar, said ridge being in contact with said nozzle to align said nozzle channel with an outlet of said manifold channel, wherein said ridge follows a substantially helical path from substantially an upstream end to substantially a downstream end of the collar.

2. The injection molding apparatus of claim 1, wherein said ridge is discontinuous.

3. The injection molding apparatus of claim 1, wherein a width of said ridge is sized to minimize contact between said collar and an outer surface of said nozzle.

4. The injection molding apparatus of claim 1, wherein said ridge is continuous and extends in a counter-clockwise direction between the upstream end of said collar and the downstream end of said collar.

5. The injection molding apparatus of claim 1, wherein the downstream end of said collar includes a second ridge formed on an outer surface of said collar.

6. The injection molding apparatus of claim 5, wherein said second ridge follows a helical path.

7. The injection molding apparatus of claim 6, wherein said second ridge minimizes contact between said outer surface of said collar and said mold plate.

8. The injection molding apparatus of claim 1, further comprising: at least two ridges.

9. The injection molding apparatus of claim 1, wherein said ridge is discontinuous and is made up of a plurality of ridge portions that are spaced one from another along said substantially helical path.

10. The injection molding apparatus of claim 1, wherein said ridge is continuous and includes at least one step provided between at least a pair of helical portions of said ridge.

11. An injection molding apparatus having a collar, the collar comprising:
    an upstream end for maintaining a head of a rear mounted nozzle in contact with an outlet surface of a manifold;
    a downstream end for abutting a mold plate;
    an inner surface for contacting an outer surface of the rear mounted nozzle to align a nozzle channel of the rear mounted nozzle with an outlet of a manifold channel of the manifold;
    a ridge formed on said inner surface, said ridge following a noncircular path from substantially the upstream end to substantially the downstream end of said collar, wherein said ridge reduces contact between the outer surface of the rear mounted nozzle and said collar.

12. The injection molding apparatus of claim 11, wherein said ridge includes at least two ridges that extend in a diagonal path between substantially the upstream end of said collar and substantially the downstream end of said collar.

13. The injection molding apparatus of claim 11, wherein said ridge includes at least two ridges that extend vertically between substantially the upstream end of said collar and substantially the downstream end of said collar.

14. The injection molding apparatus of claim 11, wherein said ridge is discontinuous and is made up of a plurality of ridge portions that are spaced one from another along a substantially helical path.

* * * * *